United States Patent
Deixler et al.

(10) Patent No.: US 12,484,130 B2
(45) Date of Patent: Nov. 25, 2025

(54) APPARATUS FOR CONTROLLING A LIGHTING SYSTEM

(71) Applicant: SIGNIFY HOLDING B.V., Eindhoven (NL)

(72) Inventors: Peter Deixler, Arlington, MA (US); Massimo Tumolo, Utrecht (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 213 days.

(21) Appl. No.: 18/271,072

(22) PCT Filed: Dec. 28, 2021

(86) PCT No.: PCT/EP2021/087731
§ 371 (c)(1),
(2) Date: Jul. 6, 2023

(87) PCT Pub. No.: WO2022/148693
PCT Pub. Date: Jul. 14, 2022

(65) Prior Publication Data
US 2024/0057233 A1 Feb. 15, 2024

Related U.S. Application Data

(60) Provisional application No. 63/134,635, filed on Jan. 7, 2021.

(30) Foreign Application Priority Data

Jan. 12, 2021 (EP) .................................... 21151069

(51) Int. Cl.
*H05B 47/115* (2020.01)
(52) U.S. Cl.
CPC ................................ *H05B 47/115* (2020.01)

(58) Field of Classification Search
CPC ...... H05B 47/115; G06V 20/52; G06V 40/10; G06V 40/20
See application file for complete search history.

(56) References Cited

U.S. PATENT DOCUMENTS

| 9,872,367 B2* | 1/2018 | Carrigan | ............ H05B 47/1985 |
| 2015/0116106 A1* | 4/2015 | Fadell | ................ G06Q 10/0631 |
| | | | 340/501 |

(Continued)

FOREIGN PATENT DOCUMENTS

| WO | 2010055205 A1 | 5/2010 |
| WO | 2018007193 A1 | 1/2018 |
| WO | WO-2019084387 A1 * | 5/2019 | .......... F21V 23/0414 |

OTHER PUBLICATIONS

"Wifi Can Do More. With Origin." Origin, Origin Wifi Sensing Technology, https://www.originwirelessai.com/, Last Visited on Jun. 15, 2023 (12 Pages).

(Continued)

*Primary Examiner* — Abdullah A Riyami
*Assistant Examiner* — Syed M Kaiser

(57) ABSTRACT

The invention refers to an apparatus (140) for controlling a lighting system (100) comprising a plurality of lights (110, 120, 130), wherein the lighting system is adapted to perform a hidden sensing, like radiofrequency sensing, in a sensing region (150). The apparatus comprises a sensing activity information providing unit (141) adapted to provide sensing activity information indicative of a hidden sensing activity of the lighting system (100), a notification mode selection unit (142) adapted to select a notification mode for notifying a person of the hidden sensing activity, wherein the selection is based on the provided sensing activity information and wherein each notification mode refers to a visual feedback, and a lighting system controlling unit (143) adapted to control at least two lights of the lighting system based on the (Continued)

selected notification mode to provide the visual feedback. The invention allows to notify a user of a hidden sensing.

13 Claims, 3 Drawing Sheets

(56) References Cited

U.S. PATENT DOCUMENTS

| | | | |
|---|---|---|---|
| 2015/0154404 A1 | 6/2015 | Patel et al. | |
| 2016/0095188 A1* | 3/2016 | Verberkt | G05B 15/02 |
| | | | 315/151 |
| 2016/0095192 A1* | 3/2016 | Vangeel | H05B 45/325 |
| | | | 315/153 |
| 2017/0150578 A1 | 5/2017 | Dureiko et al. | |
| 2017/0295630 A1* | 10/2017 | Lark, Jr. | H05B 47/155 |
| 2018/0070424 A1* | 3/2018 | Lark, Jr. | H05B 47/11 |
| 2018/0070431 A1* | 3/2018 | Charlton | H04L 12/2803 |
| 2018/0116040 A1* | 4/2018 | Mann | H05B 47/105 |
| 2018/0336420 A1 | 11/2018 | Pandharipande et al. | |
| 2020/0187336 A1* | 6/2020 | Verberkt | H05B 47/199 |
| 2022/0386436 A1 | 12/2022 | Aliakseyeu et al. | |
| 2022/0390935 A1 | 12/2022 | Aliakseyeu et al. | |

OTHER PUBLICATIONS

"Sensity Your Platform, Introducing: Sensing as a Service," Ivani, a New Class of Smart Tech, https://ivani.com/, Last Visited on Jun. 15, 2013 (6 Pages).

* cited by examiner

APPARATUS FOR CONTROLLING A LIGHTING SYSTEM

CROSS-REFERENCE TO PRIOR APPLICATIONS

This application is the U.S. National Phase application under 35 U.S.C. § 371 of International Application No. PCT/EP2021/087731, filed on Dec. 28, 2021, which claims the benefit of U.S. Provisional Patent Application No. 63/134,635, filed on Jan. 7, 2021 and European Patent Application Ser. No. 21151069.8, filed on Jan. 12, 2021. These applications are hereby incorporated by reference herein.

FIELD OF THE INVENTION

The present invention relates to an apparatus, a lighting system, a method and a computer program for controlling a lighting system.

BACKGROUND OF THE INVENTION

Hidden sensing technologies, like radiofrequency sensing, have in recent years gained a significant part in home and office applications. In contrast to open sensing technologies, in which the sensors are more or less openly installed in an area that shall be monitored, hidden sensing technologies are generally provided as part of other devices or systems, for instance, as part of a lighting system, such that a user, even when searching for it, will not be able to notice that one or more sensing devices are present and that a sensing can take place. Such hidden sensing technologies, in particular, radiofrequency sensing, can be used for a wide range of applications, for example for people detection and counting, activity recognition, health monitoring like tracking of a breathing rate or heartbeat, fall detection, etc. Generally, such hidden sensing technologies have the intrinsic advantage over a camera monitoring of an area of being less intrusive, since context information can be captured without recording any picture or audio feed. However, the actual amount of information extracted from such hidden sensing technologies can be quite high, for instance, by correlating detected body movements and changes to a breathing rate or heartbeat, certain activities of a user can be inferred by the system performing the sensing. Moreover, since it is in the nature of hidden sensing technologies that they are embedded as part of other devices and thus provide no visible sensor device to the user that could, for instance, indicate to a user that a sensing is performed, a user is not aware that a sensing is going on.

SUMMARY OF THE INVENTION

It can be seen as an object of the present invention to provide an apparatus, a system comprising the apparatus, a method, and a computer program that allow to notify a user of a hidden sensing.

In an aspect of the present invention, an apparatus for controlling a lighting system comprising a plurality of lights is presented, wherein the lighting system is adapted to perform a hidden sensing in a sensing region, wherein the apparatus comprises a) a sensing activity information providing unit adapted to provide sensing activity information indicative of a hidden sensing activity of the lighting system, b) a notification mode selection unit adapted to select a notification mode for notifying a person of the hidden sensing activity, wherein the selection is based on the provided sensing activity information and wherein each notification mode refers to a visual feedback, and c) a lighting system controlling unit adapted to control at least two lights of the lighting system based on the selected notification mode to provide the visual feedback.

Since the notification mode selection unit is adapted to select a notification mode for notifying a person of the hidden sensing activity, wherein the selection is based on sensing activity information and wherein the notification mode refers to a visual feedback assigned to the hidden sensing activity, the user can be made aware of the hidden sensing activity, in particular, of the kind of the hidden sensing activity. Moreover, since a lighting system performing the hidden sensing activity is controlled based on the selected notification mode to provide the visual feedback, no additional devices have to be provided for notifying the user. Thus, the user can be notified in a very effective manner.

The lighting system can refer to any lighting system comprising a plurality of lights installed in an area. The lights can refer to any kind of lights, for instance, to luminaires, light bulbs, lamps, LED stripes, etc. Further, the lighting system is adapted to perform a hidden sensing in a sensing region, for instance, in a region in which the lighting system is installed. A hidden sensing is defined as a sensing that is not perceivable by a user, wherein the sensing is also performed such that no sensing devices are installed in the area that can be recognized as sensing devices. Thus, in contrast to using cameras for monitoring a region, a user is generally not able to notice that a monitoring can be performed in the area. In particular, the sensing is performed by the lights of the lighting system themselves. For example, the lights can comprise additional sensors that are integrated into the lighting devices for sensing, for instance, a temperature, presence and/or motion, a light changes, etc. In particular, such sensors are used in lights or lighting systems for controlling the light providing of the lighting systems. For example, the lighting systems can be adapted to turn on the light in an area in which motion is sensed, or to turn off the light, if a daylight sensor indicates that already enough light is present in the room. However, such sensors can also be used to get very detailed information on the activities of a user in the sensing area.

In a preferred embodiment, the hidden sensing may comprise radiofrequency sensing, and the lighting system is adapted to perform a radiofrequency sensing, wherein for a radiofrequency sensing radiofrequency signals transmitted between the lights of the lighting system are used for monitoring purposes. The radiofrequency sensing may comprise sensing presence, activity, location, human vital sign, sleep pattern monitoring, fall, gesture, gait etc. Any other known or future application of radiofrequency sensing is not excluded. A detailed description on radiofrequency sensing can be found, for instance, in the article "WiBreathe: Estimating respiration rate using wireless signals in natural settings in the home", by R. Ravichandran et. al., IEEE International Conference on Pervasive Computing and Communications (PerCom), pages 131-139 (2015).

The sensing activity information providing unit is adapted to provide (radiofrequency) sensing activity information. In particular, the sensing activity information providing unit can be regarded as a storage unit storing the sensing activity information for providing the same. Moreover, the sensing activity information providing unit can also be regarded as a receiving unit for receiving the sensing activity information, for instance, from the lighting system and for providing the received sensing activity information. The sensing activity information is indicative of a hidden sensing activity of the lighting system. For example, the lighting system can be adapted to perform different sensing activities or to utilize different sensing modes. Such sensing activities can refer, for instance, to radiofrequency sensing, temperature sensing, motion and/or presence detection, etc., wherein different sensing modes can refer to occupancy detection, status detection, health monitoring, security monitoring, etc. Each of these different sensing activities can refer to utilizing different sensing data and to a different analysis of the sensing data that can lead to a plurality of conclusions about activities going on in the sensing area. Accordingly, the sensing activity information can be indicative of which sensing mode is currently performed, which information on the activities in the area is gained, etc.

The notification mode selection unit is adapted to select a notification mode for notifying a person of the hidden sensing activity, wherein each notification mode refers to a visual feedback. In particular, the different notification modes can indicate a specific visual feedback that can be provided by the lighting system. For example, a notification mode might indicate that certain lights shall provide light with a specific color, or that certain lights shall provide light with a specific light strength, etc. However, the notification mode can also define the visual feedback more general. For example, the notification mode can define how many light shall be used for the notification, maximum and minimum light strength, a wavelength range for the visual feedback, etc., without directly defining the details referring to the providing of the visual feedback by the specific lighting system. These details can then be determined, for instance, by the lighting system controlling unit when controlling the light to provide the respective feedback, wherein the lighting system controlling unit can then take further considerations into account, for instance, the characteristics of the different lights of the lighting system, etc. Preferably, a plurality of notification modes is stored in a storage unit and the notification mode selection unit is adapted to select from the plurality of notification modes a notification mode that shall be utilized for providing the visual feedback. In particular, it can be regarded that the apparatus comprises a notification mode providing unit that is adapted to provide a plurality of notification modes to the notification mode selection unit, wherein the notification mode selection unit is then adapted to select a notification mode from the plurality of provided notification modes. The selection performed by the notification mode selection unit is based on the provided sensing activity information. For example, it is preferred that each notification mode is assigned to one or more hidden sensing activities of the lighting system such that based on the sensing activity information the notification mode selection unit can select the notification mode that is assigned with the respective hidden sensing activity indicated by the sensing activity information. However, the notification mode selection unit can also be adapted as a generation unit, wherein in this case the selection of a notification mode comprises a generation of a notification mode that is based on the provided sensing activity information. For example, in this case, the notification mode selection unit can be adapted to apply predetermined rules for generating the notification mode based on the sensing activity information. For example, such rules can indicate a certain functional relation between a hidden sensing activity and a visual feedback that shall be indicated by the notification mode. For instance, the rule can indicate that with an increasing sensitivity of the information gained by the hidden sensing activity, also a visual feedback has to be increased.

The lighting system controlling unit is adapted to control at least two lights of the lighting system based on the selected notification mode to provide the visual feedback. In particular, the lighting system controlling unit can be adapted to adapt the information on the visual feedback provided by the notification mode to the respective lighting system. For example, if the notification mode indicates that the visual feedback shall refer to a certain color, whereas the lighting system cannot provide exactly this color but only a slightly different color, the lighting system controlling unit can be adapted to control the lighting system to provide the slightly different color. Moreover, the lighting system controlling unit can be adapted to determine the specifics of the visual feedback, if the notification mode does not provide these specifics, but, for instance, provides only parameter ranges for the visual feedback. In this case, the lighting system controlling unit can be adapted to determine the specifics of the visual feedback further based on additional considerations like the lighting possibilities provided by the lighting system.

Preferably, the lighting system controlling unit is adapted to control the at least two lights based on the notification mode such that each of the at least two lights provides a different visual feedback. For example, a first light can be controlled to provide a light blinking with a first frequency and a second light can be controlled to provide light blinking with a second frequency, wherein the first and the second frequency are determined, respectively, by the notification mode.

In an embodiment, the apparatus further comprises a hidden sensing result providing unit for providing a sensing result, wherein the notification mode selection unit is further adapted to select the notification mode based on the provided sensing result, and/or wherein the lighting system controlling unit is adapted to control the at least two lights further based on the provided sensing result. Preferably, the sensing result is indicative of at least one of an activity of a person, a health parameter of a person, like a breathing motion or a heartbeat, a fall of a person, a gesture of a person, a gait of a person, a location of a person, and a presence/absence of a person or a people count. The notification mode selection unit can then select the notification mode based on the provided sensing result. For example, predetermined rules can be provided to the notification mode selection unit on how to select from the plurality of notification modes a notification mode suitable to a provided sensing result. For example, sensing results indicating that a person is present and performing an active activity, like making sports, walking around in the room, etc., can result in the hidden sensing result providing unit selecting an assertive mode of notification based on the provided rules, whereas quiet activities of the user, like reading, working at a desk, sleeping, etc., might cause the hidden sensing result providing unit to select a more unobtrusive notification mode to not disturb the user during his/her activity. However, also other rules can be applied for selecting a suitable notification mode, in particular, rules can be provided by the user in accordance with his/her preference. Additionally or alternatively, the lighting system controlling unit can be adapted to control the at least one light further based on the provided sensing result. For example, if the notification mode selection unit has selected as specific notification mode referring to providing a light output with a specific color to the user, the lighting system controlling unit can be adapted to determine based on the sensing result in which area of the lighting system a user is present and to select a light located in this area to provide the selected notification mode, in this case, the light output with the specific color. Thus, it can be regarded that the lighting system controlling unit is adapted to amend, i.e. translate, the notification mode selected by the notification mode selection unit to the lighting system based on the provided sensing result.

In an embodiment, the hidden sensing result comprises information indicative of a presence, status and/or field of view of a person in a subregion of the sensing region, and the lighting system controlling unit is adapted to control at least two lights to provide the visual feedback such that the visual feedback is perceivable by the person present in the subregion. The status of a person can refer, for instance, to a current activity or position of the user like whether the person is sleeping or awake, whether the person is sitting, standing or lying down, etc. A field of view of a person can be determined, for instance, by determining an orientation of a head of a person. Such information can be easily obtained using radiofrequency sensing, but can also be obtained utilizing other sensing methodologies and information provided by the lighting system. Moreover, determining a field of view of a person can also include determining whether a person is able to see in his/her field of view a predetermined object, for instance, a screen. This information can then be used to determine a notification mode or to control the lights based on whether the predetermined object is within the field of view of the user or not. In this context, a visual feedback is generally perceivable to a person, if it is perceivable by an average human being in the respective status and/or with the respective field of view. For example, for an average human being the visual feedback is perceivable if it is performed directly in front of him/her. Preferably, the lighting system controlling unit is adapted to select at least two lights of the lighting system based on a position of the lights relative to the subregion and to control the at least two selected lights to provide the visual feedback. For example, the apparatus can further comprise a location information providing unit adapted to provide information on the location of the lights of the lighting system within the sensing area. The lighting system controlling unit can then be adapted to utilize this location information to select the at least two lights of the lighting system based on the position of the lights relative to the subregion in which the person is present. However, also the sensing result itself can be indicative of a spatial relation between one or more of the lights of the lighting system and the person present in the subregion. For example, for radiofrequency sensing the signal strength of one or more of the radiofrequency signals can indicate a relative distance between a light performing the sensing and a person causing a disturbance in the signal. Thus, the lighting system controlling unit can also be adapted to utilize the information of the spatial relationship present in the sensing result itself to select the at least two lights of the lighting system that shall provide the visual feedback.

In an embodiment, the apparatus further comprises a light characteristics providing unit for providing light characteristics indicative of characteristics of one or more of the lights of the lighting system, wherein the lighting system controlling unit is adapted to control the lights based on the light characteristics. Preferably, the light characteristics comprise at least one of a location of the light, a lighting capability of the light, and a hidden sensing capability of the light. For example, if the selected notification mode specifies that a certain color shall be provided to the user, the lighting system controlling unit can be adapted to select based on the light characteristics, in this case, in particular, based on a lighting capability of each of the lights of the lighting system, the two lights that are able to provide the specified color of the notification mode to a user. However, if none of the lights comprises a lighting capability for providing the specified light to a user, the lighting system controlling unit can be adapted to modify the notification mode such that the visual feedback can be provided to the user as near as possible as indicated by the notification mode.

In an embodiment, the apparatus further comprises a light status providing unit adapted to provide a current status of one or more of the lights of the lighting system, wherein the notification mode selection unit is adapted to select the notification mode further based on the provided light status, and/or wherein the lighting system controlling unit is adapted to control the at least two lights of the lighting system based on the provided light status. Preferably, the light status comprises information indicative of at least one of an on/off state, a dim state, a provided light color, a control status, a light application state and a sensing status. A light application state can refer, for instance, to a current and general application of the light. For example, if the light refers to a bedside lamp, it can be assumed that the general light application state of this light refers to a quiet activity like reading. Moreover, in some lighting systems it is already possible for the user to control the lighting systems by indicating the application of the lighting system the user desires, such that information on the light application state might directly be provided by a user to the lighting system and thus can be provided by the light status providing unit. The sensing status of a light can refer, for instance, on whether the light is capable of sensing, whether the light is currently performing or contributing to sensing, etc. Generally, utilizing further the light status for selecting the notification mode and/or for controlling the providing of the notification mode allows to take a current status of the lighting system into account. Also in this case, the notification mode selection unit and/or the lighting system controlling unit can use predetermined rules, for instance, rules that are provided by a user in accordance with his/her preferences, to select the notification mode and/or to control the lighting system, respectively. For example, if a light is in an off status, the predetermined rules might indicate that it is not desired by a user that a light in the off status provides a visual feedback. Thus, in this case the light system controlling unit can be adapted to only select lights that are in an on state as the at least two lights for providing the notification mode. In another example, if one or more of the lights are in a dimmed state, the predetermined rules of a user might indicate that in this case it is not desired to be disturbed by the notification mode. Thus, in this case the notification mode selection unit can be adapted to select an unobtrusive notification mode that is still perceivable by the user but generally does not disturb the user in his/her activities. Such a notification mode can refer, for instance, to provide only a very slight color difference between the at least two lights that is still perceivable by the user but is generally not considered as disturbing.

In an embodiment, the notification modes comprise a subtle mode and an assertive mode, wherein the subtle mode is less perceivable by a person than the assertive mode. In this context, the term "perceivable" is defined as being perceivable by an average human being. Moreover, both notification modes, the subtle mode and the assertive mode, are perceivable by a person, however, according to different degrees. For example, to be less perceivable, a subtle mode can utilize low contrast effects that utilize dark/light or color variations that are still perceivable but close to each other. Also, light characteristic changes, like changes of the dimming status of the light, over a long time period are generally considered to being less perceivable and thus less obtrusive than fast blinking lights. Furthermore, utilizing lights for providing the subtle mode that are not directly in the field of view of the user but only at the edges are also considered as being less perceivable. Moreover, it can also be less perceivable by a user and thus less disturbing, if only lights are utilized for providing the notification mode that are not currently under direct control of the user and/or an external system, like a multimedia system, since it can be expected that lights under direct control of the user or an external system refer to lights on which the attention of the user is focused. In an assertive mode, however, the user shall be made clearly aware of the sensing of the lighting system, independent of his/her current activities. Accordingly, in the assertive mode, a visual feedback shall be provided that cannot be "overlooked" by the user. Such feedback can be provided, for instance, using strong light/dark contrasts, color contrasts, fast changes in the lighting conditions, light changes directly in the field of view of the user or by utilizing lights on which the attention of the user is focused. Generally, the subtle mode can be selected advantageously by the notification mode selection unit in cases in which a user is generally already aware of the sensing activities and thus is only provided with a kind of confirmation that the sensing activities or which sensing activities are actually going on. In contrast thereto, the assertive mode can be advantageously selected by the notification mode selection unit in cases in which a user is generally not aware of the sensing activities, for instance, in security applications, if a new user is entering the sensing area, if a new sensing activity is introduced, etc.

In an embodiment, more than one assertive mode and/or more than one subtle mode can be provided, wherein each subtle mode is less perceivable by a person than each assertive mode. In particular, different "escalation" levels can be provided for the assertive mode. In this case, with increasing escalation level the assertive mode associated with this escalation level becomes more assertive, i.e. more perceivable, than an assertive mode of a lower escalation level. For example, when starting a breathing detection the notification mode selection unit can be adapted to select an assertive mode corresponding to a relatively high escalation level to ensure that the user takes notice of the start of the breathing detection, wherein after some time the notification mode selection unit can be adapted to select an assertive mode corresponding to a lower escalation level only to make sure that the user is still aware that the breathing sensing is still going on, but not completely disturbed by the visual feedback.

In an embodiment, at least one of the notification modes includes utilizing more than two lights for providing the visual feedback. Preferably, in all of the notification modes more than two light, more preferably all lights of the lighting system, are utilized for providing the visual feedback. This has the advantage that a wide variety of customizable notification modes can be provided that are indicative of the different sensing activities, activities of the user, lighting statuses, etc. In particular, using more than two light, preferably all lights of the lighting system has the advantage that sensing areas, actual sensing devices, sensor statuses, etc. cannot only be taken into account when selecting the notification mode but also can be very accurately indicated to the user. Moreover, it becomes much easier to also notify a plurality of different users in a sensing area, for instance, in a workspace area, about the performed sensing. Moreover, it can be prevented that a signal provided by only one light is not perceivable by the user or is misinterpreted, for instance, as failure of the light. In a particular preferred embodiment, the lighting system controlling unit is adapted to control in particular all lights currently performing the hidden sensing to provide the visual feedback of the notification mode. This allows to make the working and activities of the hidden sensing very transparent to the user and thus facilitates the trust of the user in the hidden sensing.

In another embodiment, the hidden sensing may comprise a radio frequency sensing and the hidden sensing activity may comprise one or more of a presence detection, a health parameter detection, a person and/or object monitoring via radio frequency sensing. The health parameter detection can refer, for instance, to breathing detection or heartbeat detection. However, also fall detection or a gait or movement detection is possible and can provide information on the health of a patient. Person and/or object monitoring can refer to monitoring activities of a person, a current status of a person, etc. and the object monitoring can refer, for instance, to monitoring a status of an object, like monitoring whether a door or window is closed/open. Object monitoring may further comprise atmospheric conditions detection e.g., via mm-wave or THz sensing, wherein the atmospheric conditions may comprise (but not limited to) gas sensing, ions sensing, rain sensing, fog sensing etc. Since radiofrequency sensing performed by a lighting system is generally not perceivable by a user and also not visible, for instance, by sensing devices, the application of the above described invention to radiofrequency sensing is in particular advantageous. The lighting system may comprise in an indoor environment or an outdoor environment.

In a further aspect of the invention, a lighting system comprising a plurality of lights is presented, wherein the lights are adapted for hidden sensing in a sensing region, and wherein the lighting system further comprises an apparatus as described above.

In a further aspect of the invention, a method for controlling a lighting system comprising a plurality of lights is presented, wherein the lighting system is adapted to perform a hidden sensing in a sensing region, wherein the method comprises a) providing sensing activity information indicative of a hidden sensing activity of the lighting system, b) selecting a notification mode for notifying a person of the hidden sensing activity, wherein the selection is based on the provided sensing activity information and wherein each notification mode refers to a visual feedback, and c) controlling at least two lights of the lighting system based on the selected notification mode to provide the visual feedback.

In a further aspect of the invention, a computer program for controlling a lighting system is presented, wherein the computer program comprises program code means for causing the apparatus as described above to carry out the steps of the method as described above when the computer program is executed by the apparatus.

It shall be understood that the apparatus as described above, the lighting system as described above, the method as described above and the computer program product as described above have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
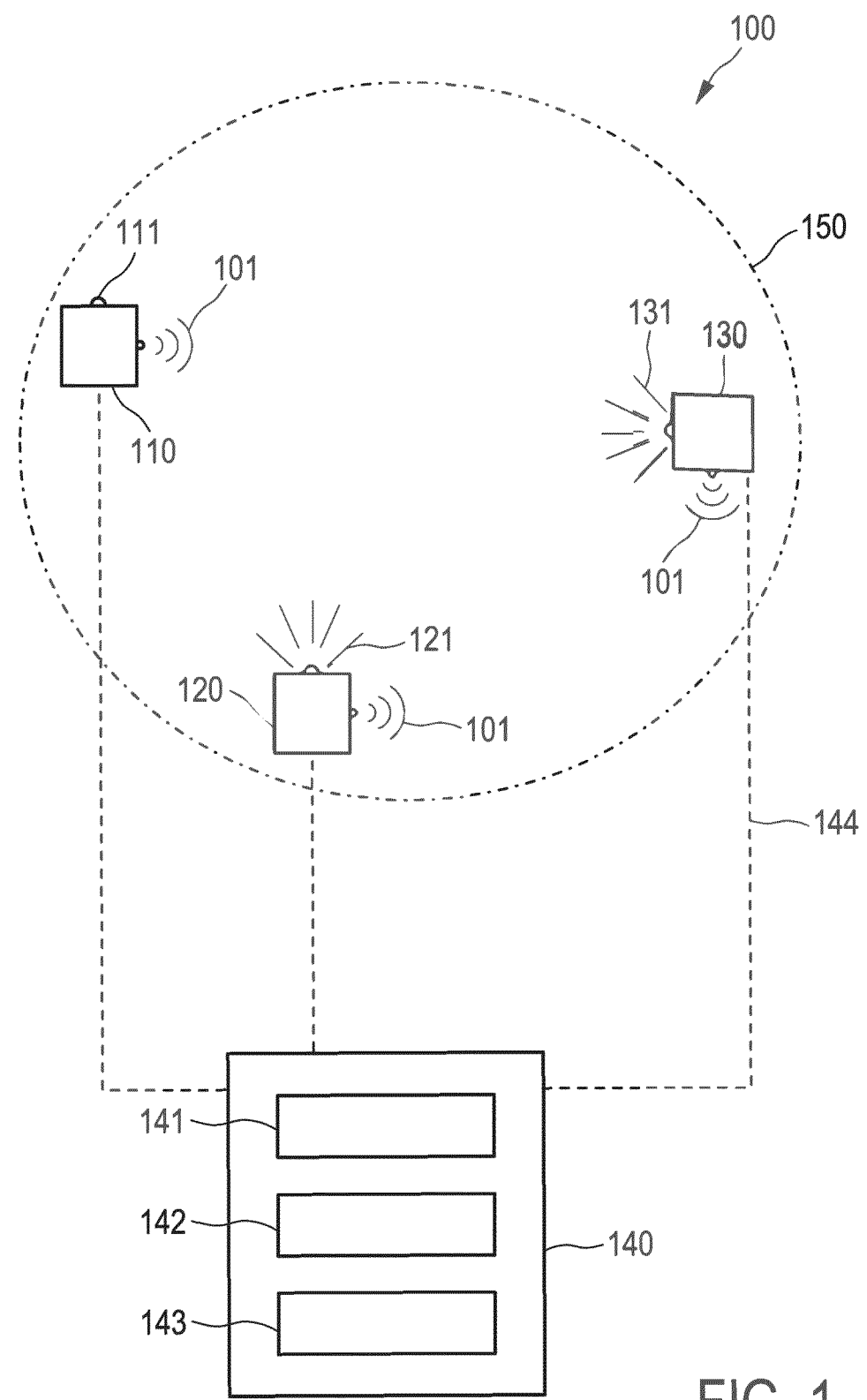
FIG. 1 shows schematically and exemplarily an embodiment of a lighting system comprising an apparatus for controlling a lighting system.

FIG. 1 shows schematically and exemplarily a lighting system 100 comprising a plurality of lights 110, 120, 130. The lights 110, 120, 130 are adapted to perform a hidden sensing in a sensing region 150. It is particularly preferred that the lighting units 110, 120, 130 are adapted to perform a radiofrequency sensing in the sensing region 150 as hidden sensing utilizing, for instance, radiofrequency signals 101. Since radiofrequency sensing is generally not perceivable by a user in the sensing region 150, radiofrequency sensing refers to a hidden sensing. In a preferred embodiment, the lighting system 100 refers to a lighting network in which the lights 110, 120, 130 refer to network devices forming the network via communication signals, for instance, radiofrequency signals 101. The lights 110, 120, 130 can refer to any kind of lights, for instance, to luminaires, lamps, LEDs, etc.

In this embodiment, the lighting system 100 further comprises an apparatus 140 for controlling the lighting system 100. The apparatus 140 can be a part of the network preferably formed by the lights 110, 120, 130. Moreover, the apparatus 140 can be an integral part of one or more of the lights 110, 120, 130, for instance, in form of hard- and/or software of the lights 110, 120, 130. In particular, the apparatus 140 can be formed as a distributed software provided within the lights 110, 120, 130 such that the apparatus 140 performs its function by utilizing a communication between the lights 110, 120, 130. However, in another preferred embodiment the apparatus is independent of the lighting system and provided, for instance, as hard- and/or software on a handheld computing system, like a smartphone, a tablet, a laptop, etc., and/or the apparatus can be provided as hard- and/or software on another computer medium like, for instance, a cloud, a personal computer, etc. In this case, the apparatus is in communication with at least one of the lights 110, 120, 130 of the lighting system 100, for instance, via a wired or wireless communication indicated by dashed line 144.

The apparatus 140 comprises a sensing activity information providing unit 141, a notification mode selection unit 142 and a lighting system controlling unit 143. The sensing activity information providing unit 141 is adapted to provide sensing activity information indicative of a hidden sensing activity of the lighting system 100. For example, in this embodiment the sensing activity information providing unit 141 can provide information that is indicative of a radiofrequency sensing performed by the lights 110, 120, 130. Moreover, the sensing activity information can also be indicative of a specific mode of radiofrequency sensing, for instance, whether only a presence detection is performed or if a more invasive detection, like health parameter detection, is performed. The sensing activity information can be provided, for instance, to the sensing activity information providing unit 141 by the lights 110, 120, 130 performing the sensing activity.

The sensing activity information providing unit 141 is then adapted to provide the sensing activity information to the notification mode selection unit 142. The notification mode selection unit 142 is then adapted to select a notification mode based on the provided sensing activity information. A notification mode shall notify a person in the sensing region 150 of the hidden sensing activity, in this case, of the radiofrequency sensing, performed in the sensing region 150. Generally, a notification mode refers to a visual feedback that shall be provided to the person to indicate the ongoing hidden sensing activity. In particular, a plurality of notification modes can be stored on a storage unit and the notification mode selection unit 142 can be adapted to select from the plurality of notification modes stored on the storage a notification mode based on the sensing activity information. For example, the notification mode selection unit can apply predetermined rules for selecting the notification mode. Such predetermined rules can be based on an input of a user of the lighting system 100 indicating specific preferences and wishes of the user, can be provided during the setup of the lighting system 100 and/or can be learned by the notification mode selection unit 142 based on input of the user after the setup of the lighting system 100. The rules can, for instance, indicate for which sensing activity which notification mode is preferred by the user. Generally, the notification modes can already provide detailed information on the visual feedback that shall be provided by the lighting system 100 or can indicate only a general setup of the visual feedback that shall be provided by the lighting system 100, wherein the details of how the visual feedback is provided by the lighting system 100 are then determined by the lighting system controlling unit 143. In a preferred embodiment, that will also be explained in more detail below, at least two notification modes are provided from which the notification mode selection unit 142 can select the notification mode, wherein the two notification modes refer to an assertive mode and a subtle mode, wherein the subtle mode is less perceivable by a person than the assertive mode. For example, the subtle mode and the assertive mode can define maximum and/or minimum light strengths for each mode, can define, whether the lights of the lighting system 100 providing the visual feedback shall have a specific spatial relation to a person in the sensing region, maximum or minimum contrasts between different lights that provide the visual feedback, color schemes, etc. However, the subtle and assertive modes can also define in detail which lights shall provide which output for the visual feedback.

After the notification mode selection unit 142 has selected the notification mode based on the sensing activity information, the lighting system controlling unit 143 is adapted to control at least two lights 110, 120, 130 of the lighting system 100 to provide the visual feedback based on the selected notification mode. For example, as shown in FIG. 1, the lighting system controlling unit 143 can be adapted to control the lights 120, 130 to provide a light output 121, 131 as visual feedback based on the selected notification mode, wherein it is noted here that the visual feedback can also be provided by not providing a light output, as shown for light output 111 for light 110. For example, light 110 might currently provide light to a user, wherein in this case the visual feedback can refer to shortly turn the light output of the light 110 off and thus to provide as visual feedback no light output 111. In particular, the lighting system controlling unit 143 can be adapted to translate the visual feedback that is indicated by the selected notification mode to the specific requirements and possibilities of the lighting system 100.

For example, if the selected notification mode indicates minimum and maximum lighting strengths that shall be utilized during selection of the notification mode, the lighting system controlling unit 143 can be adapted to select the lighting strength of, for instance, light 120, from within this range in accordance with the possibilities provided by light 120. In other embodiments, that will also be described in more detail below, the lighting system controlling unit 143 can also be adapted to select the at least two lights 110, 120, 130 from the lights of the lighting system 100 that shall provide the visual feedback of the selected notification mode, for instance, the lighting system controlling unit 143 can be adapted to select the at least two lights 120, 130 based on their spatial relation to a user present in the sensing region 150.

Based on the controlling of the lighting system controlling unit 143, the lights 120, 130 of the lighting system 100 then provide the visual feedback of the selected notification mode to a user present in the sensing region 150.

Figure 2:
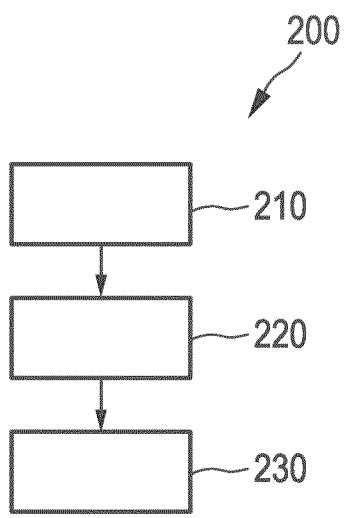
FIG. 2 shows schematically and exemplarily a flowchart of a method for controlling the lighting system.

FIG. 2 shows schematically and exemplarily a flow chart of a method 200 for controlling a lighting system, for instance, lighting system 100 shown in FIG. 1. The method comprises in a first step 210 providing a sensing activity information indicative of a hidden sensing activity of the lighting system, for instance, of a radiofrequency sensing activity of the lighting system 100. In a next step 220, the method 200 comprises selecting a notification mode for notifying a person of the hidden sensing activity, wherein the selection is based on the provided sensing activity information and wherein each notification mode refers to a visual feedback that shall be provided by the lights of the lighting system. In a last step 230, the method 200 comprises controlling at least two lights of the lighting system based on the selected notification mode to provide the visual feedback.

In the following some more detailed embodiments will be described. Generally, the invention, as described above, aims at alleviating privacy concerns with respect to hidden sensing technologies by providing, inter alia, a method on how to visualize in real time hidden sensing activities, for instance, radiofrequency sensing activities, to end-users. In particular, it is proposed to use lights of a lighting system, without any additional hardware devices or actions by the user required. For example, no look at a smart phone is required from the user to get to know the current activity of a hidden sensing. Thus, the proposed inventions makes hidden sensing technology more user-friendly. For instance, in a home space, both the inhabitants and guests can be at all times made aware of hidden sensing activities. Similarly, in the retail and hospitality space, lights can give clear indications to the customers of what is being tracked, for example, basic motion versus emotion-related metrics tracking.

Moreover, this invention allows to enable security use cases, for example, by notifying anyone approaching a house, like a mailman, potential thieves, etc., that a hidden sensing system is already actively monitoring their actions. Similarly, the invention may be useful for signaling to unauthorized persons outside a window that the system has already noticed them and therefore making them leave. The method for notifying people outside of the house with assertive light effects about the presence of hidden sensing is especially relevant in jurisdictions where usage of audio effects, e.g. security-system-sirens, pre-recorded messages, outside a house, are forbidden.

In this invention, we propose, for instance, an apparatus which allows to leverage multiple independent light sources to represent, in real time, a hidden sensing activity through concerted light effects, e.g. color propagation from one light to another. In an embodiment, the apparatus, using the notification mode selection unit and/or the lighting system controlling unit, as described above, can use knowledge about a user position, current activity, and user preferences to, at runtime, dynamically generate and provide a visual feedback pattern about the hidden sensing activity, whereby the light effect matches the current context of the user. The focus of this invention is to address privacy concerns around hidden sensing hence instructing unaware users that hidden sensing is active, and preferably notify the users about the specific currently activated mode of the hidden sensing system.

Prior art sensing systems utilize a single indicator LED to visualize whether a provided sensor is working. This indicator LED can be either single color or multi-color and may support multiple dimming levels. However, hidden sensing, like radio frequency sensing, is often a cooperative effort of many spatially distributed sensors that are not visible for a user rather than based on the results of a single prior-art PIR sensor at one location that is visible for a user.

The lighting system providing the visual feedback preferably comprises a plurality of, optionally colored, light sources that allows to provide more sophisticated visual effects than possible with a typical prior art single indicator LED on a dual-tech occupancy sensor. Hence, for example, also a type of the hidden sensing can be indicated, e.g. intrusion detection versus activity recognition, as well as a sub-space where the sensing is being executed in, e.g. out of the six lights in the open-kitchen/living room, only the three lights close to the couch are right now performing breathing detection.

In an embodiment, a notification mode is provided that refers to a subtle mode of signaling. For example, in the subtle mode a human target can be co-located with the lights that provide the visual feedback. Moreover, in this mode it is preferred that the user is already familiar with the hidden sensing system, i.e. he/she knows that the specific area of a house is covered by hidden sensing-capable devices. In the subtle mode it is preferred that the lighting system controlling unit controls the lights such that light effects are generated such that they do not disturb a user's desired light scene. In a simple embodiment, in the subtle mode the light effects, i.e. visual feedback, informs the user both about the location where sensing is currently activated and the precise type of sensing being executed, e.g. intrusion detection versus activity recognition.

In an embodiment, an assertive mode of signaling can be provided as notification mode. For example, both the subtle and the assertive mode can be provided and the notification mode selection unit can be adapted to select one of the two modes based on the information on the sensing activity. In the assertive mode a human target can be co-located or approaching the lights, wherein he/she is not upfront aware that the area is covered with hidden sensing. The lights effects of the assertive mode can then be used to notify the person that he/she is being monitored by hidden sensing. Because of the target's unawareness, the light effects of the assertive mode, unlike in the subtle mode, shall be assertive and willingly disrupt the activity of the user in order to be noticed. In addition, as the system cannot know whether the approaching person is the mailman or an aspiring burglar or peeper, it is preferred that the light effects, i.e. the visual feedback, of the assertive mode is adapted to gain the attention of a user but not to instill fear.

In addition to the visual feedback, a controlling unit, as described above, can also be adapted to control a smart audio system or voice assistant, if present in the area, together with the lights to enhance the feedback. For example, upon detection of an activity, a voice assistant can be controlled to explain a certain visual feedback, provide a message like "The activity cooking has been detected in the red area".

Generally, it is a focus of the invention to provide a real time visual feedback of hidden sensing activity using light effects, preferably, involving multiple smart lights. Multiple lights enable concerted light effects that can both represent a wide range of hidden sensing activities and their respective location in a home, and enable multiple notification modes, for instance, subtle, assertive, audio-enhanced, for signifying hidden sensing related information to the user.

Figure 3:
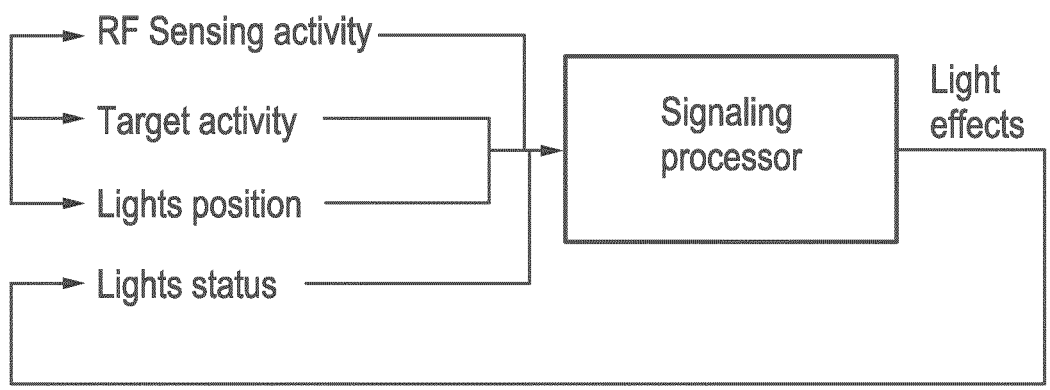
FIG. 3 shows schematically and exemplarily an overview of possibilities for selecting a notification mode and providing visual feedback.

FIG. 3 shows schematically and exemplarily an overview of possibilities for selecting a notification mode and providing visual feedback. Preferably, the apparatus performs a runtime evaluation to selecting a notification mode. For selecting the notification mode and/or for controlling the lights of the lighting system, in one embodiment a light setup, preferably, including where lights are located with respect to a user, is provided. Such information can be extracted from the light configurations, e.g. rooms and zones, or by using hidden sensing, for example, radiofrequency sensing to determine the current distance of a user from the lights. Additionally or alternatively, a current light status, preferably, including which lights are switched on, and to which scene they are currently set to can be provided. The notification mode selection unit and/or the lighting system controlling unit can then use the current light status for selecting the notification mode and providing the visual feedback. Further, additionally or alternatively, information on a target activity can be provided. For example, information on if a user is reading or sleeping in a space can be provided. This information can be extracted, for instance, using hidden sensing or can be inferred from a current light setting. For example, if an entertainment setup is on in movie mode, it can be guessed that the user is watching a movie. Or if the kitchen lights are on and living room lights off, it is expected that the user is cooking, washing the dishes, etc. Further, the apparatus can be provided, for example, during a setup of the lighting system, with user preferences regarding privacy-relevant notifications. For example, the user can manually configures his/her interest level in being kept up to date about hidden sensing activity, wherein the interest levels can range from users wanting to be kept informed about every detail, like "are right now any radiofrequency messages transmitted around the house?", to the least interested users, like "notify me only if a specific privacy sensitive sensing mode is performed in the bedroom, e.g. breathing detection". These user preferences indicated, for example, by the interest level, can be used by the notification mode selection unit to set or modify rules applied for selecting the notification mode based on the information on the hidden sensing activity.

Based on one or more of the above described information in combination with the information on the current sensing activity, the notification mode selection unit can be adapted to select during runtime which notification mode, for instance, subtle, assertive, audio-enhanced, is suitable. The lighting system controlling unit can then be adapted, for instance, to choose from a pre-configured set of specific lighting settings associated with the selected notification mode a most suited setting to signify the desired information to the user.

In the following, a more detailed explanation of the already above described subtle mode will be given. Generally, the notification mode selection unit can be adapted to select the subtle mode if the user is co-located in the same space with the lights, and he/she is actively using the lights of the lighting system at the moment, for instance, for reading. For example, the subtle mode may be used to signal a resident information about the hidden sensing activity but without disrupting the overall light setup, i.e. by avoid disturbing an almost sleeping user with sudden, pronounced light effects. Preferably, if the subtle mode is selected, the lighting system controlling unit is adapted to determine the least intrusive but still perceivable light effects associated with the subtle mode, for instance, based on current light settings and a current user activity.

For example, the notification mode selection unit can be adapted to select the subtle mode in any of the below mentioned possible application scenarios. For instance, a user falling asleep can be informed that a REM versus non-REM sleep detection mode, for example, based on WiFi sensing tracking the breathing rate, is activated and hence his/her sleep tonight will be monitored by the hidden sensing system. In another example, a user is actively using a certain light close to him, e.g. as reading light. In this case, the hidden sensing system can be adapted to switch to a heart rate detection and the user needs to be notified of this mode change. The notification mode selection unit can then select the subtle mode and the lighting system controlling unit can then select a light located closest to the user and control the light to softy blink for one second such that the user's attention is grabbed, and to control a second light further from the user, hence, not disturbing his/her activity, to start blinking at the same rhythm. The first light can then be controlled to go back to its original color, i.e. the desired color from the user for reading, and the second light can be controlled to keep a soft blinking reddish, e.g. change dim level by 5% accompanied by reddish color representing a heart, at the same rate of a typical human heart beat for a time interval, and then to stop the notification. The reddish heartbeat may match the currently recorded heartrate recorded by the hidden sensing system. In another example, a specific activity can be recognized by the hidden sensing system as sensing result. The lighting system controlling unit can then be adapted to activate all lights around the user to provide a short feedback about the detection event. Such feedbacks can be stronger/softer based on the type of activity recognized. For example, if light is utilized to read a book, it is preferred that the feedback is not intrusive, e.g. sudden brightness change, whereas, if the user is washing dishes, a more accentuated effect is acceptable, e.g. lights can blink for a small period one at a time in a circle.

In the following, an assertive mode of signaling will be described in more detail. Preferably, the notification mode selection unit is adapted to select an assertive notification mode, if the user is either co-located with or approaching the lights of the lighting system. Moreover, it is preferred that information is provided that allows the notification mode selection unit to assume that the user is not aware that the area is covered with hidden sensing. The proposed assertive light effects can then be used to notify the person that he/she is being monitored by hidden sensing. Because of the unawareness of the person of the hidden sensing system, the visual feedback, unlike in the subtle mode, shall be assertive and willingly disrupt his/her activity to avoid being missed by the person. In addition, as the system does not know whether the person is the mailman or an aspiring burglar or peeper, the light effects, i.e. visual feedback, shall gain the attention of the person, but not instill fear. Thus, when an assertive mode has been selected, the lighting system controlling unit can be adapted to find the most appropriate light effects to signify to a user yet unaware of the hidden sensing that he/she is being actively tracked. For example, the notification mode selection unit can be adapted to select the assertive mode in one of the following possible scenarios. For example, when a person is detected as approaching a house, the lighting system controlling unit can be adapted to control the lights to provide a dynamic follow-me effect of blinking lights, which increases the further the person approaches the house. The first light on the left of a pathway can be controlled to dim up from 0-50% within a two second period, then the first light can be controlled to blink and subsequently a second light on the right of the pathway is controlled to take over the blinking pattern but with an increased dim level of 60% instead of 50% and the first light is controlled to stop with the light effect, wherein then subsequently the same process repeats with a third light, which displays an even higher dim level of 70% etc. In another embodiment, the assertive mode can be selected if a passer-by violates the sphere of personal privacy of an homeowner. For example, WiFi lights located within the room can sense a passer-by's activity just outside of the window. In this case, the lighting system controlling unit can be adapted to utilize light effects within the room to signify to the passer-by that he/she will trigger a notification if he/she further progresses in his/her current direction, e.g. nosy Amazon delivery man leaving the walkway to approach a certain window. For example, the lights on the walking path to the front door can be controlled to be in "standby mode" at a constant 70% dim level and when a pedestrian deviates from the designated front-garden walking path and approaches the privacy sensitive area of the window, a ping-pong effect can start which becomes aggressively and turns to a blue/red blinking pattern indicating police flashing lights, if the Amazon mailman further deviates towards the forbidden side window.

Additionally to any of the above described modes, audio effects can be used to both enhance the light effects or complement them. For example, a light effect showing a wireless message being pushed from one light to another can be accompanied by a "whoosh" noise. The audio effect can be used just for the first view seconds. Moreover, in an advanced implementation a voice assistant can at first verbally explain what the light effect related to hidden sensing is meaning. In jurisdiction where outdoor audio speakers for home monitoring systems are legal, the audio effect can be used to further enhance the assertive mode outside of the home.

Although in the above embodiments the hidden sensing refers to radiofrequency sensing, the hidden sensing can also refer to other hidden sensing methodologies, like infrared sensing, ultrasound sensing, or generally to sensing using sensors that are not perceivable or visible to a user, for instance, since they are integrated into the lights of the lighting system, like temperature sensors, pressure sensors, humidity sensors, etc.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Procedures like the providing of the sensing activity information, the selection of the notification mode, the controlling of the lighting system etc. performed by one or several units or devices can be performed by any other number of units or devices. These procedures can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention refers to an apparatus for controlling a lighting system comprising a plurality of lights, wherein the lighting system is adapted to perform a hidden sensing, like radiofrequency sensing, in a sensing region. The apparatus comprises a sensing activity information providing unit adapted to provide sensing activity information indicative of a hidden sensing activity of the lighting system, a notification mode selection unit adapted to select a notification mode for notifying a person of the hidden sensing activity, wherein the selection is based on the provided sensing activity information and wherein each notification mode refers to a visual feedback, and a lighting system controlling unit adapted to control at least two lights of the lighting system based on the selected notification mode to provide the visual feedback. The invention allows to notify a user of a hidden sensing.

The invention claimed is:

1. Apparatus for controlling a lighting system having a plurality of lights, the lighting system being adapted to perform a hidden sensing in a sensing region, the hidden sensing having a radio frequency sensing, the apparatus comprising:
   a sensing activity information providing unit adapted to provide sensing activity information indicative of a hidden sensing activity of the lighting system, the hidden sensing activity having one or more of a presence detection, a health parameter detection, a person, and/or object monitoring;
   a notification mode selection unit adapted to select a notification mode for notifying a person of the hidden sensing activity, the selection being based on the provided sensing activity information, and each notification mode referring to a visual feedback;
   a lighting system controlling unit adapted to control at least two lights of the lighting system based on the selected notification mode to provide the visual feedback; and
   a hidden sensing result providing unit for providing a sensing result;
   wherein the notification mode selection unit is being further adapted to select the notification mode based on the provided sensing result, and/or the lighting system controlling unit is adapted to control the at least two lights further based on the provided sensing result.

2. The apparatus according to claim 1, wherein the lighting system controlling unit is adapted to control the at least two lights based on the notification mode such that each of the at least two lights provides a different visual feedback.

3. The apparatus according to claim 1, wherein the hidden sensing result is indicative of at least one of an activity of a person, a health parameter of a person, a fall of a person, a gesture of a person, a gait of a person, a location of a person, and a presence or absence of a person, or a people count.

4. The apparatus according to claim 1, wherein the hidden sensing result comprises information indicative of a presence, status and/or field of view of a person in a subregion of the sensing region, and wherein the lighting system controlling unit is adapted to control at least two lights to provide the visual feedback such that the visual feedback is perceivable by the person present in the subregion.

5. The apparatus according to claim 4, wherein the lighting system controlling unit is adapted to select at least two lights of the lighting system based on a position of the lights relative to the subregion and to control the at least two selected lights to provide the visual feedback.

6. The apparatus according to claim 1, wherein the apparatus further comprises a light characteristics providing unit for providing light characteristics indicative of characteristics of one or more of the lights of the lighting system, wherein the lighting system controlling unit is adapted to control the lights based on the light characteristics.

7. The apparatus according to claim 6, wherein the light characteristics comprise at least one of a location of the light, a lighting capability of the light, and a hidden sensing capability of the light.

8. The apparatus according to claim 1, wherein the apparatus further comprises a light status providing unit adapted to provide a current status of one or more of the lights of the lighting system, wherein the notification mode selection unit is adapted to select the notification mode further based on the provided light status, and/or wherein the lighting system controlling unit is adapted to control at least two lights of the lighting system based on the provided light status.

9. The apparatus according to claim 8, wherein the light status comprises information indicative of at least one of an on/off state, a dim state, a provided light color, a control status, a light application state and a sensing status.

10. The apparatus according to claim 1, wherein at least one of the notification modes includes utilizing more than two lights for providing the visual feedback.

11. A lighting system comprising a plurality of lights, wherein the lights are adapted for hidden sensing in a sensing region, wherein the lighting system further comprises an apparatus according to claim 1.

12. A method for controlling a lighting system comprising a plurality of lights, the lighting system being adapted to perform a hidden sensing in a sensing region, the hidden sensing having a radio frequency sensing, the method comprising:
 providing sensing activity information indicative of a hidden sensing activity of the lighting system, the hidden sensing activity having one or more of presence detection, a health parameter detection, a person, and/or object monitoring;
 providing a sensing result;
 selecting a notification mode for notifying a person of the hidden sensing activity, the selection being based on the provided sensing activity information, each notification mode referring to a visual feedback, and the selection being based the provided sensing result; and
 controlling at least two lights of the lighting system based on the selected notification mode to provide the visual feedback and/or based on the provided sensing result.

13. A non-transitory computer readable medium comprising program code to perform the method of claim 12 when run on at least one processor.

* * * * *